United States Patent Office 3,567,519
Patented Mar. 2, 1971

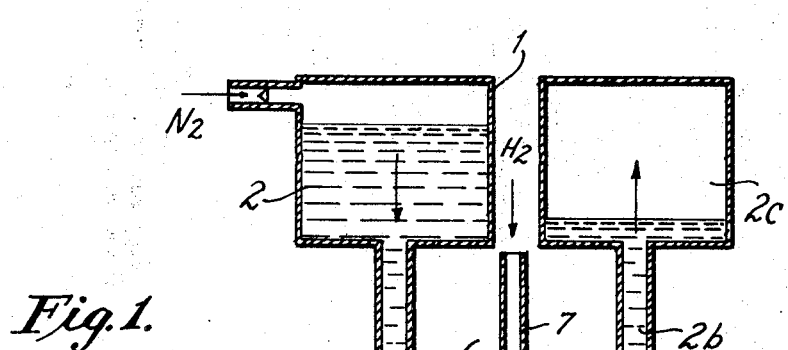
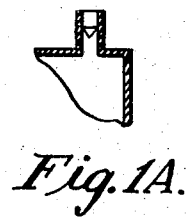
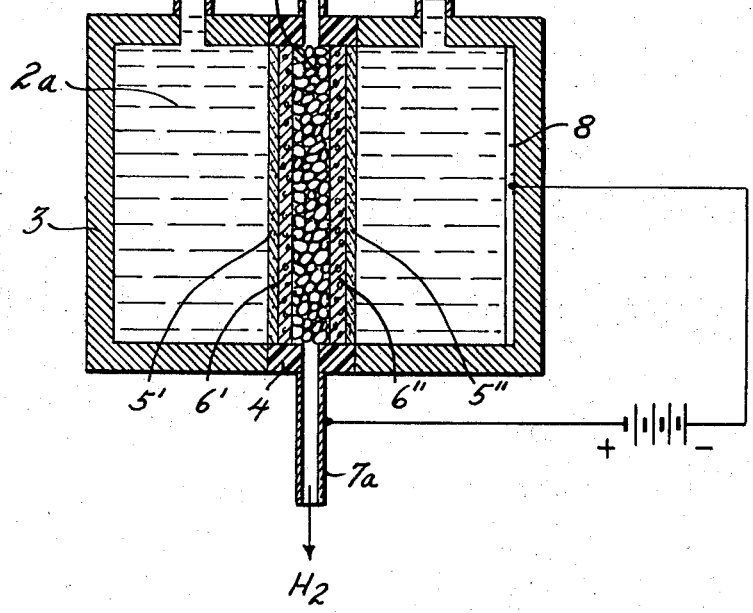
Fig. 1.
Fig. 1A.
Fig. 1B.
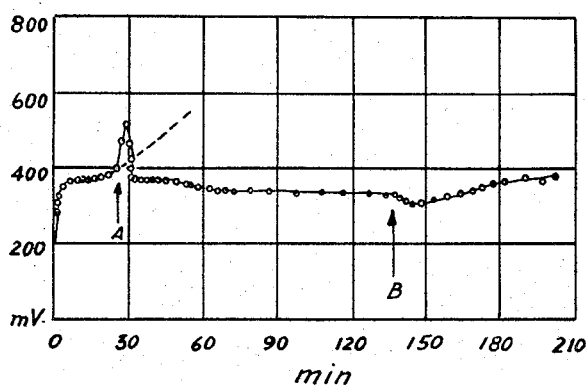
Fig. 2.
INVENTORS.
RALF WENDTLAND
AUGUST WINSEL
ATTORNEY.

3,567,519
DEPOLARIZATION PROCESS
Ralf Wendtland and August Winsel, Braunschweig, Germany, assignors to Siemens Aktiengesellschaft, Berlin and Munchen, and Varta Aktiengesellschaft, Frankfurt am Main, Germany
Continuation-in-part of applications Ser. No. 269,907, Apr. 2, 1963, now Patent No. 3,428,491, and Ser. No. 545,986, Apr. 28, 1966. This application Oct. 4, 1968, Ser. No. 765,134
Claims priority, application Germany, Apr. 30, 1965, P 15 46 719.3
Int. Cl. H01m 27/00
U.S. Cl. 136—86                         12 Claims

ABSTRACT OF THE DISCLOSURE

A method of controlling the concentration polarization during the operation of a fuel cell. Electrolyte is passed through the small pores of an electrode from one face thereof in one electrolyte chamber to the other face in another electrolyte chamber while reaction gas is passed through the coarser pores of the electrode.

---

This application is a continuation-in-part of copending application Ser. Nos. 545,986, now abandoned and 269,907, now U.S. Pat. No. 3,428,491, filed on Apr. 28, 1966 and Apr. 2, 1963, entitled "Method for Lowering the Polarization in Electrochemical Processes" and "Method and Apparatus for Reducing the Concentration Polarization of a Fuel Cell," respectively.

The invention relates to a method for increasing the potential in electrochemical processes. The invention also relates to a method for minimizing the decrease of such a potential by decreasing the concentration polarization in electrochemical systems using gas diffusion electrodes. The invention also relates to an apparatus to carry out the process.

Conventional gas diffusion electrodes comprise at least one porous, catalytically active, working layer at which under the influence of a suitable catalyst, a chemical reaction proceeds which converts a reactant (a liquid, gas, etc.) and delivers directly electrical energy. Under the influence of capillary pressures electrolyte may enter into the pores of the catalytically active "working" layer. By increasing the gas pressure, these pores can be blown free of electrolyte if to the working layer there is affixed a cover layer which has smaller pores and which prevents the escape of the gases into the electrolyte chamber.

As is known for the electrochemical conversion and utilization of gases, it is necessary that a three-phase boundary between electrode-electrolyte-gas be established throughout the transition areas between the gas-filled and electrolyte-filled pores. When the electrode is subjected to an electric load, the electric current must be carried by the ions of the electrolyte present within these pores. The differential in mobility of the ions and the slow diffusion of the neutral particles in the narrow pore interstices cause a concentration drop during the operation of the cell from the pores in the cover layer opening into the free electrolyte to those in the three-phase boundary zone in the working layer. This drop causes a concentration polarization and, furthermore, in alkaline electrolyte at the hydrogen electrode, and in acid electrolyte at the oxygen electrode, the creation of limiting current density. These limiting current densities considerably decrease the capability of the electrodes to work at a low polarization.

Concentration polarization represents a shift in the potential of one electrode as a consequence of concentration changes in the electrolyte in the immediate vicinity of its surface resulting from a net passage of current. With gas diffusion electrodes, as used herein, another particular type of polarization is called "gas-side concentration polarization" and is related to the mass transport of gaseous reactants and products through the pores of the porous electrode to the triphase equilibrium sites of the working layer of the electrode.

As disclosed in copending patent application Ser. No. 269,907, it is possible to minimize and control the concentration polarization and also the creation of a limiting current density by providing fresh electrolyte at the triple interphase electrode-electrolyte-gas necessary for the electrochemical conversion of the gas. The pores are flushed with the electrolyte by periodic lowering or raising of the gas pressure to introduce fresh electrolyte into the gas chamber, and by using the pressure differential between electrolyte and gas chamber to supply electrolyte into the electrolyte chamber through the electrode. These measures significantly control the concentration polarization drop in the pores.

Electrodes can be subject to electric load during such flushing if reaction gas is sorbed in the catalytic material of the electrode. In practice, the cell is turned off and is not operative during the flushing process.

Another serious disadvantage of prior methods is that the flushing of the electrodes can not be carried out on a continuous basis. As a result, apart from further complexities in the construction of a suitable apparatus, there arise also periodic variations in the voltage of the fuel cell battery.

The process of the invention overcomes the above-described difficulties encountered in connection with polarization during operation of an electrochemical process.

The process of the invention provides a method for maintaining the polarization of an electrode (a porous hydrogen or oxygen electrode) as low as selected even in operations of the fuel cell over long periods of time. The process comprises maintaining an electrolyte flow from one electrolyte-containing zone to another electrolyte-containing zone through all the layers of pores, including the working layer of a gas-diffusion electrode by means of a pressure differential between the two sides of the electrode. The flow of electrolyte permeating through the interstices of the body of a porous electrode is initiated at and maintained for selected periods of time till the polarization is decreased to the desired level. The flow of electrolyte is maintained by a pressure differential between the electrolyte inlet surface of the electrode and its outlet surface. The fresh electrolyte is forced into the inlet side of the electrode, and spent electrolyte flows out at the other side. The porous electrode acts as a separator between fresh and spent electrolyte liquid in two separate electrolyte chambers.

While electrolyte flows through the electrode, reaction gas passes through its coarser pores, as described in further detail hereinafter. Thus, the pores of the working layer are filled concurrently with gas and electrolyte. This permits the flushing of the electrode to be carried out continuously without interruptions of the current delivery of the battery.

That an electrochemical process could be carried out successfully under such conditions was not foreseeable since in accordance with prevailing conventional concepts, it was believed that the pores of the working layer, which is under gas pressure, should be filled exclusively with gas and be free of electrolyte. Notwithstanding this belief, the two electrolyte chambers are connectable with electrolyte films crossing through the gas and working layers of the electrode. The flow of fresh electrolyte provides continuous films to the immediate proximity and to the reaction zone. Thus the very areas in which there prevails a drop in concentration of transporting electrolyte ions during electrical current discharge are thus rinsed with fresh electrolyte, and concentration polarization is controlled.

The process of flushing the electrodes can be carried out continuously or intermittently during the operation of the electrode. Moreover, the apparatus with which the process is carried out eliminates the usual gas chambers, which adjoin each electrode of traditional fuel cell batteries. The apparatus is therefore of more compact and simpler construction that conventional batteries.

The method of the invention is particularly well suited for use in conjunction with gas-diffusion electrodes which have at least two layers of interconnecting pores of different average porosity: the gas-carrying pores and the electrolyte-carrying pores. The layers of pores which have the largest average pore diameter serves as the gas-conducting pore layer, while the pores which have a smaller average pore diameter serves as the electrolyte-conducting pore layer. The gas-conducting layer is generally positioned within the electrolyte-conducting layer, but, as described hereinafter its pores may be interspersed with the electrolyte-carrying pores.

In one favored embodiment the porous electrode consists of three layers: a gas-conducting layer of large pores positioned between two outer layers of smaller pores, these two layers being affixed to the outwardly or electrolyte-facing faces of the gas-conducting layer. These two layers are the catalytically active layers, or so-called working layers. Optionally, the working layers can have affixed thereto a cover layer, which may be a diaphragm whose average porosity is smaller than that of the above-mentioned working layers. These layers assist in preventing escape of gas into the electrolyte chambers. The Janus-type electrode is typical thereof. The electrodes used in the process are hydrophilic with respect to the electrolyte. As is known, the innermost working layer comprises the gas-conducting large pores and the electrolyte-conducting smaller pores, and also microscopic interconnecting channels which are created upon dissolution of the catalytically inactive component from the Raney alloy during manufacture of the electrodes.

During the operation of the fuel cell and in the process of the invention, the small pores are continuously flooded with electrolyte (while the larger pores are gas-filled) which is maintained therein by capillary pressure pK exerted within the interconnecting pores, wherein $pK = 2\sigma/r$, in which $r$ is the radius of the electrode pores and $\sigma$ is the surface tension of the electrolyte.

The electrodes used need not have their coarse pores form a gas layer as such. The electrode body can be riddled with coarser pores which carry reaction gas and interdispersed with smaller pores which carry the electrolyte and which are in communication with the larger pores, this layer of mixed pores thus being considered the working layer. Such electrodes are disclosed, for instance, in copending patent application Ser. No. 495,323, now U.S. Pat. No. 3,481,789 filed Oct. 12, 1965. In such an electrode there is desirably affixed two cover layers as described above. The cover layers can be any suitable layer having pores which have an average diameter smaller than the average diameter of the pores of the working layer.

The desirable differential in average pore radius between the gas and electrolyte conducting pores are known in the art, for instance in U.S. Pats. 2,946,836 and 3,201,282, which are incorporated by reference. The total porosity of the electrode body, the size (as measured by the diameter) of the pores, the relative size of the interstices in the skeleton structure and the pores, can be varied and selected to suit best the requirements and needs under operative conditions, in particular the pressure of the reactant gas. The small pores in the electrode may range from diameters too small to measure to an average diameter of about 30 microns, generally from 0.1 to 10, preferably from 2 to 7 microns, but they may be also larger as of 50 microns. The larger pores may measure, as an average, a diameter ranging from about 10 to 1000 times that of the smaller pores. The porosity is readily determined, as is known by the size of particle used in the manufacture of the electrodes.

In the electrode used the catalytically active porous working layer has an average pore radius $r_1$. The catalytically inactive porous cover layer has an average pore radius $r_2$, which is smaller than radius $r_1$ at any one point and greater than zero in at least one surface portion. The pore radii $r_1$ and $r_2$ of the electrode used in the invention may be adapted to the particular requirements by using powders for making the electrode body layers with defined particle sizes, as is known. Thus, it is possible to preselect as desired the average pore radius of such an electrode layer between, for instance, 0.1 and 100 microns. For practical use, the range of pore radii of between 0.5 and 50 microns has been found to be best suited, since the resultant capillary pressures reached in operation are easily accommodated to conventional valves and pressure gauges.

It is important that the difference of the pore radii of the working layer and the surface layer $r_2$ be sufficiently great so as to offset safely any variations of the pore radii with respect to the average pore radius of each particular layer, which may occur in all practical cases. Therefore, the average pore radii are advantageously chosen such that there is optimumly only little overlapping of the distribution functions of the pore radii of the working and surface layers. It has been found that the relation $r_1 \geq 1.5 \cdot r_2$ sufficiently excludes any significant overlapping of this pore distribution function.

The relative volume of coarse pores to small pores can be made to suit the pressure at which the fuel cell will be operated. In general, the ratio of total volume of the gas-carrying coarse pores to that of the electrolyte-carrying small pores in the electrode structure ranges from about 1 to 1 to about 1 to about 3.0. The volume of the smaller pores may also be increased to reach a ratio of 1 to 5. The total volume of the large pores can also exceed that of the smaller pores, such as by a ratio of 5 to 1.

The above and other objects, advantages and features of the present invention will be more fully understood when considered in connection with the detailed description of certain embodiments thereof, taken in conjunction with the accompanying drawings wherein:

FIG. 1 is a side-elevational view of a system of the invention showing the electrolyte containers, the chambers therefor and two electrodes;

FIGS. 2 and 3 are a graphical representation of the effects of the process of the invention on the concentration polarization.

Figure 3:
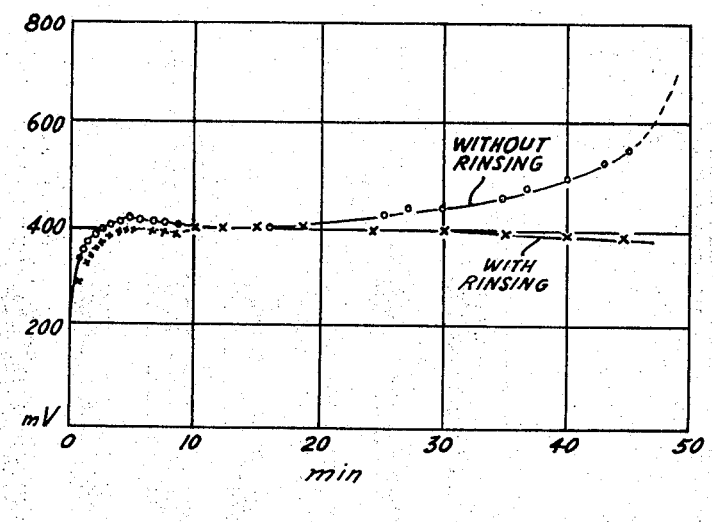

In accordance with the process of the invention, reactant gas is introduced into the gas-conducting layer of the electrode, reacted in the working layer whose small pores are flooded with electrolyte. The gas then exits at the other side of the electrode after longitudinal passage therethrough. Both at inlet and outlet of the electrode, the gas is essentially free of electrolyte.

The electrode in accordance with the process of this invention separates two electrolyte chambers in which there prevails a pressure differential resulting from the resistance to the electrolyte flow through the electrode. The positive pressure is on the inlet face of the electrode creating within the porous electrode body films or fine streams of electrolyte which maintain the two outer faces of the electrode in communication by flowing from one of these faces to the other.

The process of the invention is not limited to any specific explanation or scientific theory of the manner in which the electrolyte flows into one side of the electrode through one of its cover layers, through the gas-conducting pores, the working layer and out of the electrode through the opposite cover layer. It is thought, however, that the electrolyte flows as thin films or streams along the finely-branched sintered skeleton structure in which the larger gas-conducting pores are distributed, and through the microscopic interconnecting conduits which riddle the catalytic skeleton after its catalytically inert metals, such as aluminum are dissolved out of the Raney alloy, to yield the Raney metal. That the electrolyte flow takes place is evident from its outflow from the electrolyte chamber adjoining that in which it is fed and its absence from the gas outflow.

The pressure differential desired between the two faces of the electrode is sufficient to create a flow of electrolyte from one face to the other. Optimum conditions are readily selectable from the nature and porosity of the electrode, the electrolyte and the fuel, and the rapidity with which it is desired to reestablish or establish the desired potential. The desired operating pressure differential is established and maintained by increasing the pressure of the electrolyte supply, and/or by applying suction to the electrolyte outlet. Conventional electrolytes as known in the art are used in the process and apparatus.

Desirably the flow of electrolyte per cm.$^2$ area measured at the electrolyte outlet is maintained at least at 0.06 ml./hr., advisedly in the range of 0.03 to 6.0 ml./hr., especially in the range of 0.6 to about 3.0 ml./hr. As is apparent, the flow and amount of electrolyte are relatively slow and low. The pressure differential between the two chambers can be maintained at least at 0.05 atm., advisedly in the range of 0.1 to 0.5 atm.

During the operation of the fuel cell, the reaction gas flows through the large pores of the electrodes at a pressure $P_G$ which is selected to be greater than sum of the hydrostatic pressure P in the electrolyte chamber and the capillary pressure in the larger pores of a radius of $r_2$ of the working layer, yet smaller than the total of the pressure in the smaller pores of a radius $r_1$ of the cover layers. The pressure of the reaction gas can thus be selected and maintained to conform to the equation $2\sigma/r_1 + P > P_G > 2\sigma/r_2 + P$. By maintaining the gas pressure within these limits, the gas flows longitudinally through the large pores of the electrode while the electrolyte flows through the entire width of the electrode in its small pores, along the skeleton of the electrode and in the interconnecting channels of microscopic pores of the Raney metal catalyst without flooding the gas-filled pores and without being blown out therefrom. This also results from the fact that the capillary pressure $P_K$ is related to the radius $r$, of the electrodes pores and $\sigma$, the surface tension of the electrolyte as follows:

$$p_K = \text{constant} \cdot \frac{\sigma}{r}$$

in which the greater the size of the pores, the smaller $P_K$.

The pressure of the reactive gas can be modified if needed, but more desirably it is maintained constant within the ranges set forth above.

The method of the invention is applicable to reduce the polarization in any electrochemical process wherein a porous electrode is separating two electrolyte-containing chambers and where gas for reaction is made to flow through the electrode.

The electrode of the invention can be a fuel electrode to which the reaction gas is delivered or an electrode to which oxygen or an oxygen-containing gas is supplied. The system of the invention is preferably used in a fuel cell or in a fuel cell battery. Useful combustible gases include hydrogen, carbon monoxide, methane, ethylene, etc., as is disclosed in U.S. Pat. 2,946,836, which is incorporated herein by reference.

The flow of fresh electrolyte through the electrode can be initiated at any desired time; quite desirably it is initiated when the voltage of the electrode, with respect to a reference electrode, drops below a certain value which can be pre-set. The valve controlling pressure can be reset independently to close after a predetermined time period or after the initial voltage or a predetermined voltage has been reached by the effect of the flow of fresh electrolyte through the pores of the electrode. It is preferable to effect the closing of the valve after a predetermined time period if economy of fresh electrolyte is a principal consideration.

It is evident from the above description that in accordance with the invention, the polarization in the process can be maintained at a predetermined constant low level, and polarization increases of the electrode can be controlled or compensated, as desired. Over extended periods of operations, there is a significant improvement in the stability of the output of the fuel cell.

The invention is further illustrated by the following non-limiting examples in which reference will be made to the figures.

EXAMPLE 1

In a die mold of 40 mm. diameter there are uniformly introduced in sequence the following powder mixtures. First the cover layer of 3 grams of carbonyl nickel powder (particle size of about 7 microns in diameter), then the working layer of 15 grams of a mixture of Raney-nickel powder (particle diameter size of less than 40 microns), carbonyl nickel powder (particles of a diameter of about 7 microns) and potassium chloride, as a pore former (particle diameter of less than 100 microns) in a weight relation of 1:4:1. The third layer forming the other cover layer is made of 3 grams of carbonyl nickel powder (particle diameter size of about 7 microns).

The three layers are compacted at 400° C. and a pressure of 1.4 tons per cm.$^2$. There is obtained a disk-like electrode of a thickness of 3.5 mm. which is then clamped into a Plexigum holder (a rigid polymethylmethacrylate) and then placed in boiling water to leach out the potassium chloride. The electrode is activated in the customary manner with strong alkali. Two nickel tubes which serve concurrently as gas inlet and outlet and as electric leads for the electrode are then screwed into the Plexigum frame. The three-layered electrode has an inside gas-conducting layer, a working layer and two exterior cover layers on either side of the working layer facing two separate electrolyte chambers.

As is illustrated in FIG. 1, there is provided container 1, for electrolyte 2 (6 normal potassium hydroxide). The electrolyte is placed under nitrogen gas pressure of 1.2 atm. causing a flow of electrolyte at a rate of 0.13 ml. per minute from chamber 2 into chamber 2a of container 3. The electrolyte then proceeds into the electrode framed by holder 4 through cover layer 5′ into working layer 6′, gas layer 6, layer 6″ and then out through outer cover layer 5″, into electrolyte chamber 2b. Through inlet 7 there is introduced the reactive hydrogen gas, under a pressure of 2.4 atm. The gas reacts catalytically in the working layer and exits at 7a. On the side opposite the exit side of the fuel electrode, there is affixed counter electrode 8. When the pressure built up in chamber 2c reaches a desired level, the gas inflow is interrupted and the electrolyte flow reversed from chamber 2b to 2a. As illustrated in FIG. 1A, a gas outlet can be provided in chamber 2c to allow for escape of excess pressure. As shown in FIG. 1B, gas outflow can additionally be controlled by a valve in outlet 7a.

The electrode polarization is measured in a known manner against a standard reference hydrogen electrode (not illustrated) at the side facing counter electrode 8. The electrode 8 is a nickel double-skeleton catalyst electrode.

FIG. 2 shows the effect of the electrolyte flow on the polarization level. At a time $t=0$ the electrode is subjected to a current load of 100 ma./cm.$^2$. After about 20 minutes, the concentration polarization of the electrode increases rapidly as is shown by the dotted line on the graph. At the time indicated by A, electrolyte is forced through the electrode. After a temporary initial increase of the potential, the electrode polarization dropped and was constant over a period of about 2 hours. At the time indicated on the graph by B, the flushing of the electrode pores was discontinued. At that time after a limited temporary drop the polarization again started to increase sharply. By repeating the flushing with fresh electrolyte, the potential was again maintained at a lower lever over an additional 2 hours. The temperature was 25.5° C.

EXAMPLE 2

FIG. 3 to which reference is now made shows comparative experiments with and without the flushing of electrolyte. Curve 1 shows the concentration polarization without flowing electrolyte and curve 2 with the passage of electrolyte. The current load is 114 ma./cm.$^2$ and the temperature is 35° C. Curve 1 shows the increasingly greater drop of electrode potential which is already evident after 20 minutes of operation. Curve 2 shows a substantially constant potential by maintaining a flow of fresh electrolyte through the communicating pores of the electrode. In this manner, the current density and thereby the load on the electrode can be significantly increased.

EXAMPLE 3

Figure 4:
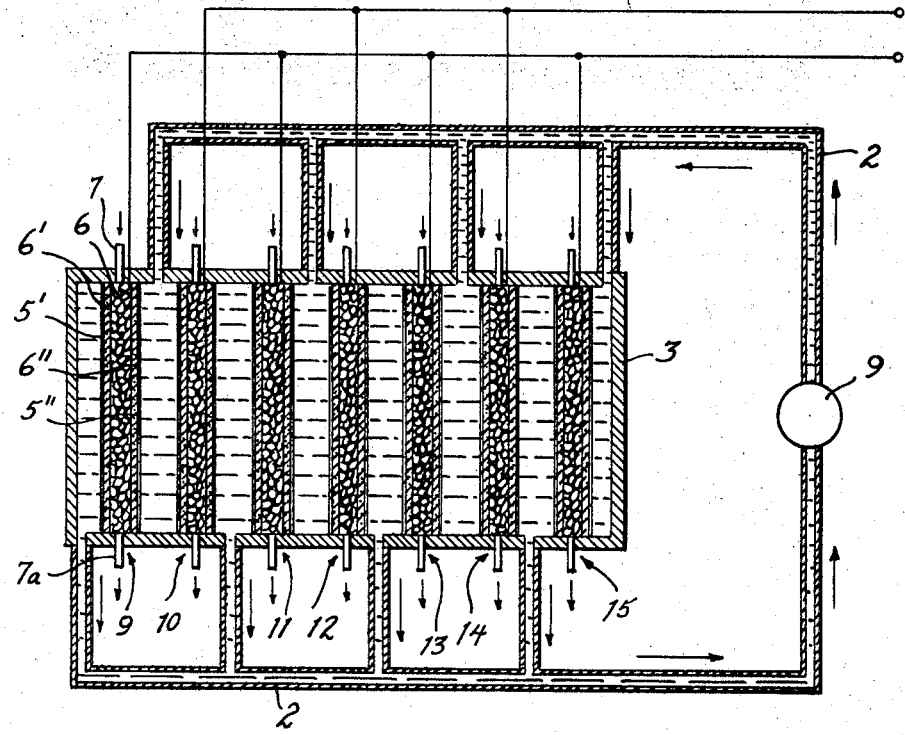
FIG. 4 is a complete battery of electrodes electrically connected in parallel and operated in accordance with the invention.

A complete battery is constructed in which the electrodes are electrically connected in parallel as is illustrated in FIG. 4. As is shown, electrodes 9 to 15 illustrate gas diffusion electrodes with two faces. They comprise alternatingly oxygen electrodes 9, 11, 13, 15, and hydrogen electrodes 10, 12, and 14. They are made of the materials described in Example 1.

The electrolyte containing chambers are connected in series two by two with respect to electrolyte flow as is illustrated, to non-immediately adjoining chambers. The system is connected by pump 9 which starts and keeps the electrolyte in circulation, as desired. The system operates efficiently to maintain a substantially constant potential, correcting the polarization as the need occurs.

Preferably, the system is placed under a differential pressure not exceeding about 0.1 atm.

If the electrodes are of different porosities, or of different catalytic activity and the polarization does not develop evenly at each electrode, the individual cells of the battery can be operated at different pressure differentials with a flow of electrolyte adjusted to correct the individual polarization prevailing in each electrode. It is thus feasible to correct the polarization of a single or of a multiplicity of fuel cells to maintain a constant potential over long periods of operations.

We claim:

1. In an electrochemical system which comprises a battery of fuel cells with electrolyte and including porous hydrophilic electrodes having a catalytically active working layer and a cover layer in contact with the electrolyte, said catalytic layer having a multiplicity of relatively large pores and relatively small pores therein with intercommunication therebetween and separating the respective cells into a plurality of electrolyte chambers, there prevailing a pressure differential between each pair of neighboring electrode chambers, the process of controlling concentration polarization during operation of the fuel cell, comprising passing the electrolyte under a pressure from chamber to chamber through the electrodes via relatively small pores thereof while passing reaction gas at a higher pressure through the electrodes via relatively large pores thereof and excluding the gas from the electrolyte chambers by intervening layers of relatively small pores.

2. The process of controlling concentration polarization according to claim 1 in which the electrolyte flow is initiated when the polarization increases beyond a selected value and maintained until the polarization is decreased to a predetermined level.

3. The process of controlling concentration polarization according to claim 1 in which the electrolyte flow is adjusted as required to give a constant potential during the operation of the battery.

4. The process of controlling concentration polarization according to claim 3 which comprises recycling the electrolyte.

5. The process of controlling concentration polarization according to claim 1 in which the electrolyte flow is intermittent and is repeated from time to time during the operation of the electrochemical system.

6. The process of controlling concentration polarization according to claim 1 in which the reaction gas pressure is maintained to be greater than the sum of the hydrostatic pressure in the electrolyte chambers and the capillary pressure in the larger pores of the working layer and smaller than the total pressure in the smaller pores of the intervening layer, so that no electrolyte is entrained with the gas outflow of the electrode.

7. The process of claim 1 wherein the pressure differential between a pair of neighboring chambers is in the range of 0.1 to 0.5 atm.

8. A fuel cell battery comprising two terminal electrolyte chambers, a multiplicity of fuel cells, each fuel cell comprising one porous gas-diffusion electrode separating two electrolyte chambers each one adapted with an electrolyte inlet means or an electrolyte outlet means, one of said electrodes being a fuel electrode and the other being an oxidant electrode, each electrode being adapted with gas inlet and outlet means and having, in a catalytically active working layer, coarse gas-conducting pores and smaller electrolyte-conducting pores in communication with each other, and a cover layer on each electrolyte-contacting face of each electrode, the average diameter of the pores of the cover layer of the electrode being smaller than that of the pores of the working layer of the electrode, and conduit means serially connecting the electrolyte chambers in pairs for circulating the electrolyte.

9. Process for minimizing concentration polarization in an electrochemical reaction system comprising a fuel cell with electrolyte and having a porous hydrophilic electrode having a catalytically active reaction zone comprising a multiplicity of relatively large pores and a multiplicity of relatively small pores with intercommunication therebetween, the electrode being bounded over part of its peripheral surface by at least one covering layer of relatively small pores, comprising passing electrolyte under pressure through such covering pores, and through the catalytically active reaction zone via the relatively small pores thereof, passing reaction gas through, at a pressure higher than the electrolyte pressure, the peripheral surface of the zone left unbounded by the covering pores and separate from the passageways for the electrolyte, and through the catalytically active reaction zone via the relatively large pores thereof thereby excluding the electrolyte from the relatively large pores in the reaction zone by reason of the higher gas pressure and excluding the gas from the electrolyte passageways by reason of the covering small pores being impervious to the electrolyte at the given pressure thereof.

10. The process of minimizing concentration polarization according to claim 9, wherein the electrolyte flow rate is in the range of about 0.03 to 3.0 ml./hr./cm.²

11. Process of minimizing concentration polarization according to claim 9, wherein the gas pressure exceeds the electrolyte pressure by about one atmosphere.

12. Process of minimizing concentration polarization according to claim 11, wherein the gas pressure is about 2.4 atmos. and the electrolyte pressure is about 1.2 atmos.

References Cited

UNITED STATES PATENTS

| | | | |
|---|---|---|---|
| 3,404,038 | 10/1968 | Winsel | 136—86 |
| 3,215,562 | 11/1965 | Hindin | 136—86 |
| 3,227,585 | 1/1966 | Langford et al. | 136—86 |
| 2,925,454 | 2/1960 | Justi et al. | 136—86 |

WINSTON A. DOUGLAS, Primary Examiner

H. FEELEY, Assistant Examiner